United States Patent [19]

Nilsson

[11] 4,423,345

[45] Dec. 27, 1983

[54] MAGNETO FLYWHEEL ASSEMBLY

[75] Inventor: Mats Nilsson, Åmål, Sweden

[73] Assignee: Aktiebolaget Svenska Elektromagneter, Åmål, Sweden

[21] Appl. No.: 227,470

[22] Filed: Jan. 22, 1981

[30] Foreign Application Priority Data

Jan. 30, 1980 [SE] Sweden ................................ 8000746

[51] Int. Cl.³ .......................................... H02K 21/22
[52] U.S. Cl. ..................................... 310/153; 310/42; 29/598; 123/149 D
[58] Field of Search .................... 310/153, 67, 74, 156, 310/42, 62, 43, 63, 45; 74/572; 123/149 D; 29/598

[56] References Cited

U.S. PATENT DOCUMENTS

| | | | |
|---|---|---|---|
| 2,945,138 | 7/1960 | Strang | 310/153 |
| 3,258,623 | 6/1966 | Phelon | 310/153 |
| 3,290,525 | 12/1966 | Sudmeier | 310/153 |
| 3,663,850 | 5/1972 | Phelon | 310/153 |
| 3,818,586 | 6/1974 | Harkness | 310/153 |
| 3,828,212 | 8/1974 | Harkness | 310/153 |

Primary Examiner—R. Skudy
Attorney, Agent, or Firm—Hill, Van Santen, Steadman & Simpson

[57] ABSTRACT

A magneto flywheel includes arcuate ceramic magnets of non-uniform radial thickness. A rotor for the flywheel is made of soft material. The magnets of the magneto flywheel have a set of radial poles of alternating polarity, and an other set of opposite poles directed toward the cylindrical periphery of the magneto rotor. A ferromagnetic band of deflectible material with the surface projection is disposed between the rotor and the magnets.

8 Claims, 8 Drawing Figures

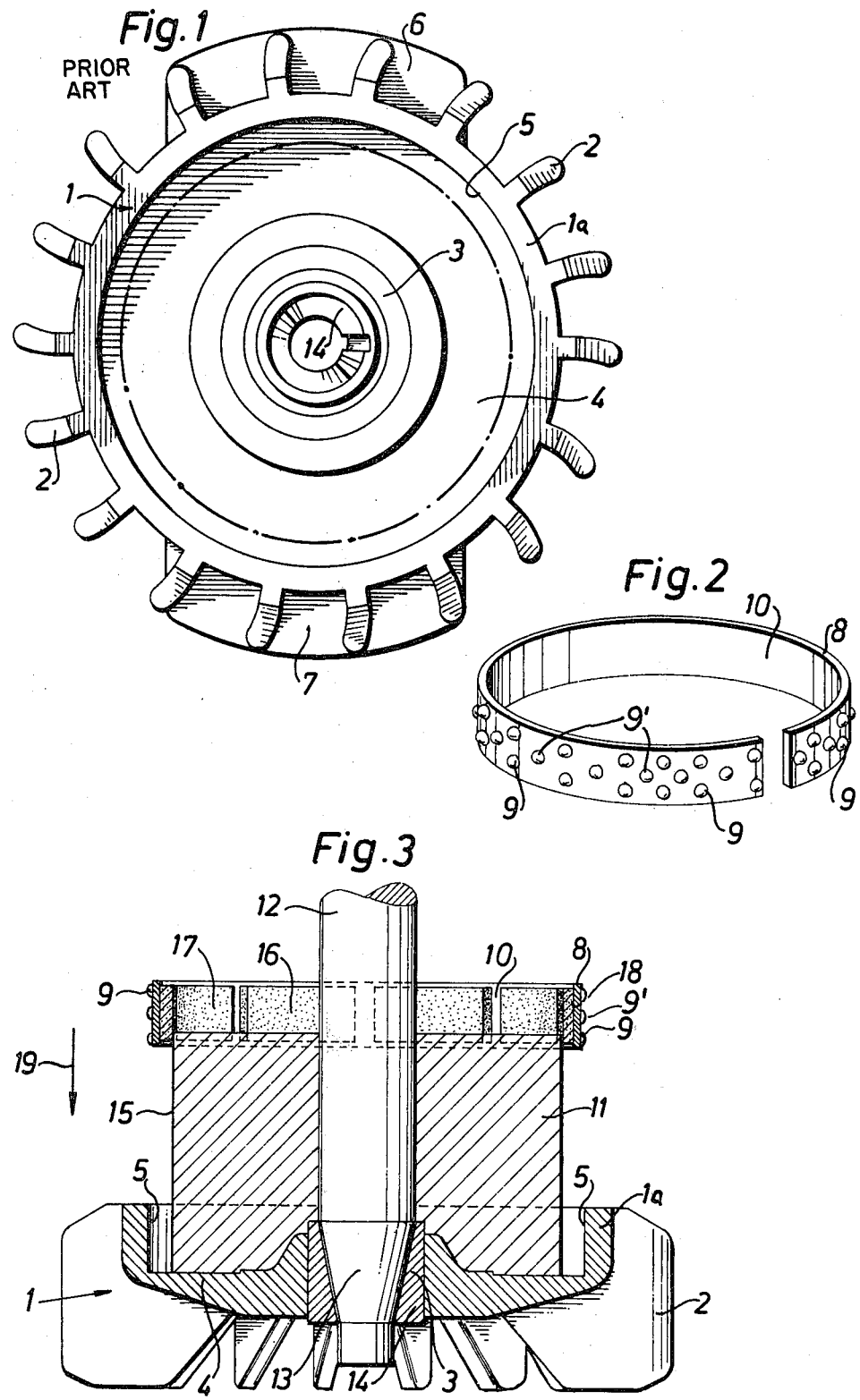

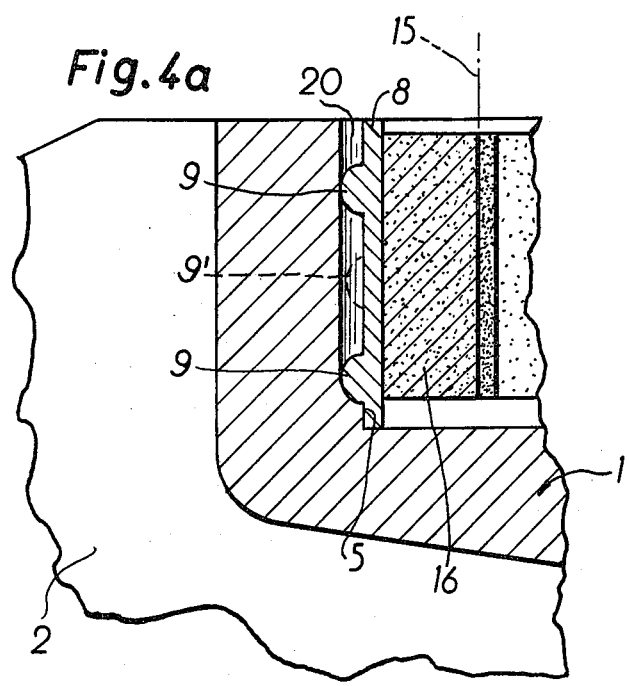
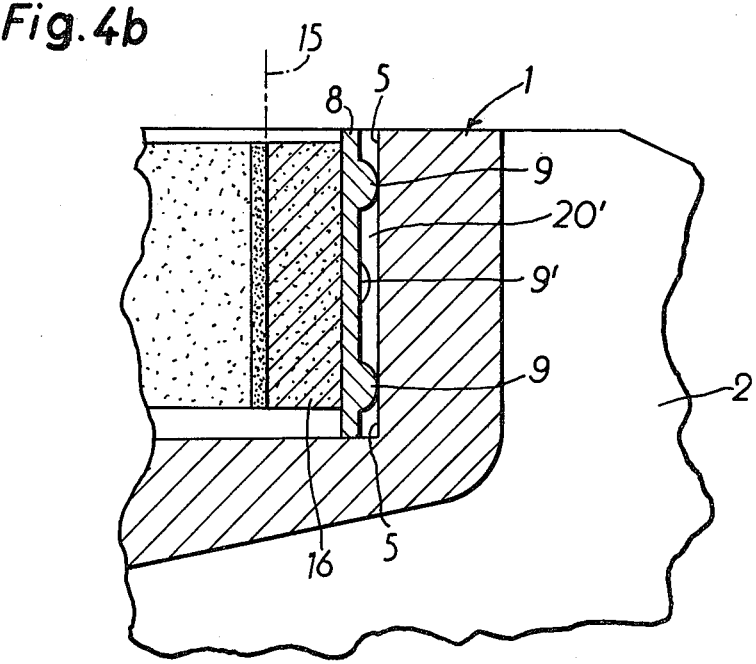

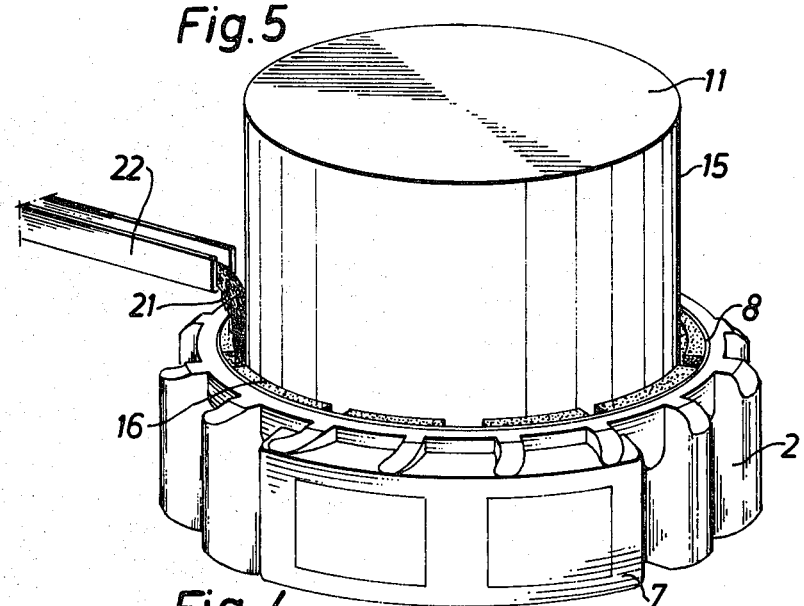
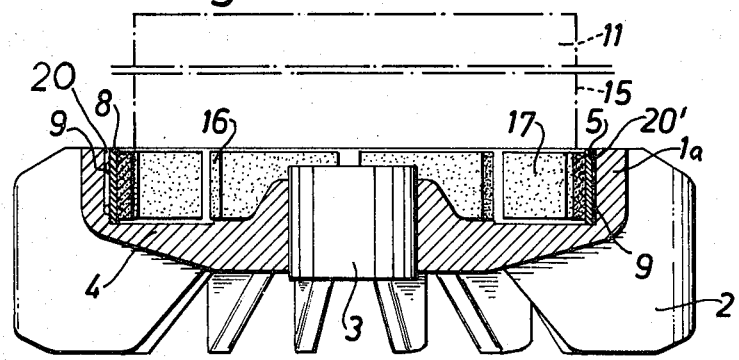
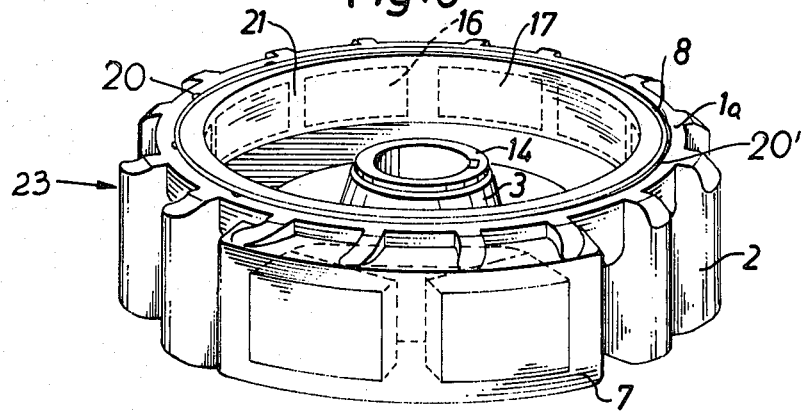

MAGNETO FLYWHEEL ASSEMBLY

BACKGROUND OF THE INVENTION

1. Field of the Invention

This invention pertains to a magneto flywheel assembly.

2. Prior Art

Magneto flywheel assemblies employ magnets which are usually of the ceramic type. These magnets are formed as plates which are disposed for being magnetized in a direction normal to their plane to form a magnetic field which when mounted in the flywheel is in a radial direction. The ceramic magnets or plates are usually made as arcuate segments, with a radius substantially corresponding to the radius of the surface of the flywheel in which they are to be mounted. However, it is especially difficult to achieve exact dimensions for such magnet sections, especially due to dimensional variations caused by firing of the ceramic. As a consequence, the desired accurate engagement against other magnetically conductive portions will occur only at small areas. As a consequence, the magnetic conducting capacity in the circuit coacting with the magnets is adversely affected. It has been attempted to force the magnet segments into proper engagement so as to slightly alter their shape, but such attempt has most often crushed some of the magnet segments, necessitating their replacement. It has also been attempted to grind the segments, but such a remedy is not satisfactory because the magnetic properties are adversely affected by any mechanical machining procedure.

SUMMARY OF THE INVENTION

The present invention relates to a magneto flywheel assembly which comprises a simple and effective solution to the foregoing problem. According to the invention, a ferromagnetic band or keeper used to complete the magnetic circuit, and which is anchored in the flywheel, is made with projecting portions to provide an irregular cylindrical surface. The magnet segments along with the band are supported on a mandrel and are slid therealong into engagement with an opposing cylindrical wall of the flywheel which comprises softer material. The projecting or irregular portions of the band coact with the flywheel or rotor so that the band is forced to form itself in conformity to the back surface of each magnet segment, and thus good magnetic contact is obtained between the band and each of the associated magnet segments. The magnets are then fastened in place, such as by being encapsulated in a plastic material.

Accordingly, it is an object of the present invention to achieve good magnetic contact between ceramic magnets and a ferromagnetic band which jointly form part of a magnetic circuit in a magneto flywheel assembly.

Another object of the invention is to eliminate the problem of ceramic magnets becoming crushed as a consequence of forced assembly.

Yet a further object of the invention is to provide a good surface contact between the ceramic magnets of a magneto flywheel assembly and the adjacent ferromagnetic portions thereof.

A still further object of the present invention is to improve the generating efficiency of a magneto flywheel assembly.

Many other features of the present invention will become manifest to those versed in the art upon making reference to the detailed description and the accompanying sheets of drawings in which a preferred structural embodiment incorporating the principles of the present invention is shown by way of illustrative example.

On the Drawings:

FIG. 1 illustrates a conventional flywheel rotor showing its concave side;

FIG. 2 is a perspective view of a metal band provided in accordance with the invention;

FIG. 3 illustrates certain steps in manufacturing the magneto flywheel assembly according to the invention.

FIG. 4 illustrates a further phase of manufacturing, FIGS. 4a and 4b being respectively enlargements of the left and right portions of FIG. 4;

FIG. 5, appearing with FIG. 4, illustrates a further manufacturing step; and

FIG. 6 is a perspective view of the completed flywheel assembly.

AS SHOWN ON THE DRAWINGS

The principles of the present invention are particularly useful when embodied in a magneto flywheel assembly such as shown in FIG. 6, generally indicated by the numeral 23. The construction of the assembly 23 can best be understood by a consideration of individual components thereof and their method of assembly.

As shown in FIG. 1, the assembly includes a rotor 1 of soft material such as aluminum, including alloys thereof, the rotor 1 having a cylindrical rim portion 1a on which there are formed a number of fins 2 that serve as a fan. The central portion thereof constitutes a hub 3 secured to the rim portion 1a by a web portion 4. The rim portion 1a has a cylindrical periphery here an inner surface 5 which, though not illustrated, may be slightly conical. The rotor has a projecting portion 7 which includes a magnetic system for providing a field which operates a magneto ignition circuit, and directly opposite therefrom there is disposed a second projecting portion 6 which functions as a counterweight.

The inner peripheral surface 5, and the projecting portions 6,7 are accurately concentric with the hub 3. Although it would be difficult to illustrate in the drawings, the cylindrical periphery 5 is slightly conical so that the portion thereof nearest the web 4 has a somewhat smaller diameter.

FIG. 2 shows a band 8 made of deflectable ferromagnetic metal which has a hardness which is harder than the relatively soft metal of the rotor 1. The band 8 may be made as a single piece as shown extending under 360° and it could comprise shorter segments. On the outer surface of the band 8, there are formed irregularities, one type of which is illustrated as comprising surface projections in the form of hemispherial nodules. On assembly, the nodules will be directed toward the cylindrical periphery 5a, which in the illustrated embodiment is a radially outward direction. The nodules are arranged in a plurality of circumferential rows, the nodules 9 lying in rows that are uppermost or lowermost and the nodules 9' lying in a further intermediate row. The band 8 has an inner surface 10 which is to engage one side of the ceramic magnets and which is to be formed or conformed thereagainst. To form the band 8, a strip of the material is passed between forming rollers, one of which has appropriate pockets or indentations into which the metal will flow during rolling to thus form the nodules 9,9'. The rolled strip is then cut to provide the proper length for a band or band segment, and then the strip is passed between the forming rollers to provide an appropriate outside diameter slightly less, in this embodiment, than the cylindrical periphery 5 of the rotor 1.

To assemble the assembly 23, the rotor 1 is fitted with a mandrel 11 and a central shaft 12 which has a frusto-conical end 13 which is accurately located in a frusto-conical portion 14 of the hub 3. The mandrel 11 has a cylindrical surface 15 which simulates the envelope within which a stator will lie. A series of arcuate magnet segments 16, here eight in number, is disposed about the upper end of the mandrel surface 15, and the band 8 is disposed about the series of magnets 16, here functioning as a clip. The magnets 16 are radially magnetized and are arranged so that adjacent poles have an opposite magnetic polarity. Thus, a first set of poles 17 is directed toward the mandrel 15 and, thus, jointly lie in a cylindrical surface. A second set of poles 18 is directed in the opposite radial direction. Thus, the rotor 1 has been mounted on the mandrel 11 in concentric relation as provided by the central shaft 12, and the magnets 16 have been disposed on the cylindrical surface 15 of the mandrel 11 remotely from the rotor 1, the band having been placed on the magnets 16 at the side thereof remote from the mandrel 11. With this arrangement, the nodules or projections 9,9' are directed away from the mandrel 11. By means of an appropriate press, the magnets 16 and the band 8 are jointly forced to slide along the cylindrical surface 15 of the mandrel 11 in the direction of an arrow 19 to force the parts being moved into the annular space between the cylindrical periphery 5 of the rotor and the cylindrical surface 15 of the mandrel 11. This movement continues until the parts are fully seated as shown in FIG. 4 wherein the mandrel has been shown in phantom lines. As the parts are received into the rotor 1, the projections 9,9' come into engagement with the cylindrical periphery 5 of the rotor 1. Since the radial distance between the cylindrical periphery 5 and the cylindrical surface is not greater than the sum of the thicknesses of each magnet and the band 8 at each of the projections, a progressively heavy engagement of the band 8 against the rear surfaces of the magnets 16 having the second set of poles 18 takes place as the band and segments continue to be forced into the rotor 1.

FIGS. 4a and 4b respectively show the left and right ends of FIG. 4 and are enlarged to illustrate just what takes place. As stated above, it is known that the various magnet segments 16 will have a varying thickness. FIG. 4a schematically illustrates the greatest thickness of a magnet segment 16 while FIG. 4b illustrates the smallest thickness of another one of the segments 16. Thus, there is a range within which the thicknesses will vary. The band 8 is so formed that its thickness remote from the nodules will exactly complement the maximum magnet thickness and just fill the space into which the parts are to be pressed, disregarding the nodules 9. The band 8 is so formed that it has a thickness taken through the nodules 9,9' which complements the minimum thickness expected from the magnets so as to just fill the space in question. In either event, the variation in spacing between the second set of poles 18 and the cylindrical periphery 5 is taken up by the band 8. Where there is an interference, the leading or lowermost nodule 9 as shown in FIG. 4a will form a groove 20 as a result of the interference fit. Where there is progressively more clearance, the nodules 9,9' merely have a tight press fit in the gap 20' as shown in FIG. 4b. In either of these extreme cases or in intermediate instances, the band 8 is deflected by the forces applied by the rotor against the various nodules 9,9' to snuggly fit the band against the magnet surfaces to provide an efficient large area of contact between the magnets 16 and the band 8. Thus, when the gap or radial space is not fully filled by the magnet segment and the band 8, the projections 9 bridge the remaining portion of the gap to obtain the reactive force that is needed from the rotor rim portion, and where there is no such gap, the rotor rim portion being relatively softer, yields as shown at 20 to enable the nodules to form groove therein. Thus, by the interference fit described, very positive anchoring of the band 8 is provided by the material of the flywheel rotor. However, this engagement provides the desired complete contact between the back poles 18 and the inner surface 10 of the band 8. Even if the front surfaces or first set of poles 17 should engage against the cylindrical surface 15 of the mandrel with a spot or line contact, a substantial force can be applied against the magnets since they are gently and uniformally supported at their back surfaces or second set or poles 18 by the band 8.

At this point during the assembly, there is the greatest possible contact interface between the band 8 and the magnet segments 16, and while this condition is maintained, as shown in FIG. 5, a readily pourable plastic in liquid form, such as a 2-component urethane plastic of a common type, shown at 21 in FIG. 5, is poured from a spout 22 to fill all the voids that exist in the radial space between the cylindrical surface 15 and the cylindrical periphery 5 including the voids 20 and 20'. Thus, the plastic 21 is molded in situ and upon curing, and all the components are thereby firmly held together.

When the encapsulating step is included as the means for holding the components together, the mandrel surface 15 is previously provided with a coating of a release agent such as a layer of Teflon (a DuPont trademark). Once the plastic has cured, the mandrel 11 may be removed.

As shown in FIG. 6, the segments have become encapsulated in the plastic composition, the band 8 is firmly anchored to the rotor 1 and is partially embedded in the rotor as shown by the other ends of the grooves 20.

After the foregoing steps have been taken, the outer edge of the cylindrical rim portion 1a may be machined as well as the bottom of the web 4 shown in FIG. 1 within the chain line. The inner cylindrical surface shown in FIG. 6 is formed by the plastic material 21 and does not need machining since the cylindrical surface 15 on the mandrel 11 provides adequate smoothing and appropriate sizing. Since the magnetic segments 16 were pressed very had against the cylindrical surface 15 of the mandrel 11 that condition provides that the front surfaces or first set of poles 17 have received only an extremely thin layer of the plastic material. Tests have shown that the structure is extremely stable while simultaneously there has been obtained an extremely effective magnetic circuit. Improvements in field strength of up to 25 percent have been achieved as a result of this invention.

Where the magnetic system in the projecting portion 7 is used as part of a magneto ignition circuit, one excellent application of the magnetic field provided by the magnets 16 is as part of a generator used to provide current to heat the handles of a chain saw powered by an engine having the flywheel assembly 23. The invention can be utilized to produce flywheel assemblies wherein the magnetic field is to be directed radially outwardly as is the field from the projecting portion 7, in which case an inner surface of a tubular mandrel would be utilized.

Although various minor modifications might be suggested by those versed in the art, it should be understood that I wish to embody within the scope of the patent warranted hereon, all such embodiments as reasonably and properly come within the scope of my contribution of the art.

I claim as my invention:

1. A magneto flywheel assembly, comprising:
   (a) a rotor having a cylindrical periphery of relatively soft material;
   (b) a series of arcuate ceramic magnets fixed on said rotor and arranged in a circle and disposed along said cylindrical periphery, said magnets having a non-uniform radial thickness, said magnets having a first set of radial poles of alternating polarity directed radially away from said cylindrical periphery and arranged cylindrically, and a second set of opposite poles directed toward said cylindrical periphery, there thereby being a variation in spacing between said second set and said periphery; and
   (c) a band of deflectable ferromagnetic metal harder than said soft material, and disposed between said magnets and said periphery, said band having a number of surface projections directed toward said periphery, said band having a thickness remote from said projections corresponding to the minimum size of said variation in spacing, and a thickness through said projections corresponding to the maximum size of said variation in spacing;
   whereby said cylindrical periphery forces said band to deflect against said variably disposed second set of poles and permits certain of said projections to be radially received at least in part into the softer cylindrical periphery.

2. A magneto flywheel assembly according to claim 1, said projections being directed radially outwardly against said cylindrical periphery, the latter being directed radially inwardly.

3. A magneto flywheel assembly according to claim 2, said projections comprising hemispherical nodules lying in a plurality of circumferential rows, said band carrying said projections extending arcuately for less than 360°, said softer cylindrical surface comprising aluminum, and said magnets and said band being encapsulated in molded plastic.

4. A magneto flywheel assembly according to claim 1, said band extending arcuately for less than 360°.

5. A magneto flywheel assembly according to claim 1, said softer cylindrical surface comprising aluminum.

6. A magneto flywheel assembly according to claim 1, said projections comprising hemispherical nodules.

7. A magneto flywheel assembly according to claim 1, said projections lying in a plurality of circumferential rows.

8. A magneto flywheel assembly according to claim 1, including molded plastic between said band and said cylindrical periphery and filling voids adjacent to those of said projections which are not fully received in said softer cylindrical periphery.

* * * * *